(12) United States Patent
Ryan

(10) Patent No.: US 6,469,729 B1
(45) Date of Patent: Oct. 22, 2002

(54) LASER MARKING DEVICE AND METHOD FOR MARKING ARCUATE SURFACES

(75) Inventor: Daniel J. Ryan, Scyamore, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 09/608,315

(22) Filed: Jun. 30, 2000

Related U.S. Application Data (63) Continuation-in-part of application No. 09/418,713, filed on Oct. 15, 1999.
(60) Provisional application No. 60/108,797, filed on Nov. 14, 1998.

(51) Int. Cl.[7] ............................................... B41J 2/435
(52) U.S. Cl. ........................................ 347/248; 256/347
(58) Field of Search ............................ 347/4, 248, 234, 347/250, 235, 256

(56) References Cited

U.S. PATENT DOCUMENTS

| | | | |
|---|---|---|---|
| 4,829,175 A | * 5/1989 | Goto et al. ................. 250/236 |
| 4,946,234 A | * 8/1990 | Sasada et al. ............... 359/221 |
| 5,013,108 A | 5/1991 | Amstel |
| 5,025,268 A | 6/1991 | Arimoto et al. |
| 5,287,125 A | 2/1994 | Appel et al. |
| 5,383,047 A | 1/1995 | Guerin |
| 5,432,536 A | * 7/1995 | Takada et al. ............... 347/140 |
| 5,583,559 A | 12/1996 | Nakamura et al. |
| 5,734,412 A | 3/1998 | Hasebe et al. |
| 5,754,219 A | 5/1998 | Ruckl |
| 5,754,328 A | 5/1998 | Cobb et al. .................. 359/208 |
| 5,767,483 A | * 6/1998 | Cameron et al. ....... 347/225 X |
| 5,771,062 A | 6/1998 | Nomura et al. |
| 5,828,481 A | 10/1998 | Cobb et al. |

FOREIGN PATENT DOCUMENTS

| | | |
|---|---|---|
| DE | 197 39 767 A | 3/1999 |
| EP | 0 601 444 | 6/1994 |

* cited by examiner

*Primary Examiner*—David F. Yockey
(74) *Attorney, Agent, or Firm*—Piper Rudnick; Joel H. Bootzin (57) ABSTRACT

A laser marker employs a laser beam, an optical scanner that scans the laser beam along an optical path, and an optical element having a variable image distance. The optical element is located after the scanner and is tilted with respect to the optical axis of the scanner by an amount sufficient to create a desired variable image distance as the laser is scanned across the optical element. The scanning of the scanner is synchronized to the motion of the substrate by determining a first component of motion of a substrate to be marked by using an encoder and storing data representing a second component of motion of the substrate in a memory. In a preferred embodiment, the optical element is a spherical lens.

15 Claims, 9 Drawing Sheets

| Step | Shoe Angle | Aggregate Angle | Shoe Angle Relative to Aggregate | Shoe Incremental Angle | Shoe Incremental Linear Distance | Compensation Factor | Scanner Voltage Gain Factor |
|---|---|---|---|---|---|---|---|
| 0 | -23.78 | 0 | 66.22 | | | | |
| 1 | -40.27 | 3 | 52.50 | 13.72 | 0.71 | 0.35 | 1.98 |
| 2 | -56.87 | 6 | 39.00 | 13.50 | 0.70 | 0.34 | 1.47 |
| 3 | -71.85 | 9 | 27.50 | 11.50 | 0.60 | 0.24 | 1.22 |
| 4 | -84.03 | 12 | 17.80 | 9.90 | 0.52 | 0.16 | 1.11 |
| 5 | -94.17 | 15 | 8.80 | 8.80 | 0.46 | 0.10 | 1.05 |
| 6 | -105.42 | 18 | 0.90 | 7.90 | 0.41 | 0.05 | 1.02 |
| 7 | -117.08 | 21 | -5.90 | 6.80 | 0.36 | 0.00 | 1.00 |
| 8 | -125.17 | 24 | -11.50 | 5.60 | 0.29 | -0.07 | 0.98 |
| 9 | -131.87 | 27 | -15.00 | 3.50 | 0.18 | -0.18 | 0.95 |
| 10 | -135.35 | 30 | -15.60 | 0.60 | 0.03 | -0.33 | 0.91 |
| 11 | -136.62 | 33 | -13.70 | -1.90 | 0.10 | -0.26 | 0.93 |
| 12 | -134.68 | 36 | -8.70 | -5.00 | 0.26 | -0.10 | 0.96 |
| 13 | -132.42 | 39 | -3.50 | -5.20 | 0.27 | -0.09 | 0.96 |
| 14 | -132.62 | 42 | -0.40 | -3.10 | 0.16 | -0.20 | 0.96 |
| 15 | -136.07 | 45 | 1.00 | -1.40 | 0.07 | -0.29 | 0.95 |
| 16 | -136.17 | 48 | 1.40 | -0.40 | 0.02 | -0.34 | 0.94 |
| 17 | -139.60 | 51 | 1.90 | -0.50 | 0.03 | -0.33 | 0.95 |
| 18 | -140.77 | 54 | 3.20 | -1.30 | 0.07 | -0.29 | 0.95 |
| 19 | -140.13 | 57 | 7.00 | -3.80 | 0.20 | -0.18 | 0.96 |
| 20 | -132.85 | 60 | 16.30 | -9.30 | 0.48 | 0.12 | 1.02 |
| 21 | -126.35 | 63 | 26.40 | -10.10 | 0.53 | 0.17 | 1.02 |
| 22 | -121.27 | 66 | 34.70 | -8.30 | 0.43 | 0.07 | 1.01 |
| 23 | -120.38 | 69 | 38.70 | -4.00 | 0.21 | -0.15 | 0.98 |
| 24 | -121.38 | 72 | 40.40 | -1.70 | 0.09 | -0.27 | 0.97 |
| 25 | -124.40 | 75 | 40.00 | 0.40 | 0.02 | -0.34 | 0.96 |
| 26 | -128.75 | 78 | 39.50 | 0.50 | 0.03 | -0.33 | 0.96 |
| 27 | -131.52 | 81 | 39.50 | 0.00 | 0.00 | -0.36 | 0.96 |
| 28 | -134.70 | 84 | 39.50 | 0.00 | 0.00 | -0.36 | 0.96 |
| 29 | -137.37 | 87 | 39.55 | -0.05 | 0.00 | -0.36 | 0.97 |
| 30 | -139.73 | 90 | 39.60 | -0.05 | 0.00 | -0.36 | 0.97 |
| 31 | -143.28 | 93 | 39.70 | -0.10 | 0.01 | -0.35 | 0.97 |

Fig.9.

LASER MARKING DEVICE AND METHOD FOR MARKING ARCUATE SURFACES

CROSS-REFERENCES TO RELATED APPLICATIONS

This is a Continuation-In-Part of application Ser. No. 09/418,713 filed Oct. 15, 1999 which claims the benefit of 60/108,797 filed Nov. 14, 1998.

BACKGROUND OF THE INVENTION

This invention relates to laser marking devices. More particularly, it relates to laser marking devices for marking substrates such as labels with date codes, lot numbers and related information to permit a manufacturer to track products. Typically such marking systems are used to mark alpha-numeric characters on the desired substrate whether the product itself, a label applied to the product or packaging in which the product is shipped. In the typical laser marking device the surface to be printed is moved past the laser beam which is scanned across it in a manner to apply the alpha-numeric information. The surface to be marked should move such that it is always within the depth of focus (focal plane) of the marking system. For the typical surface, which is planar, the optics can be preset or automatically adjusted to maintain a given focal distance such that high quality characters can be marked thereon. When, however, the motion of the object or the curvature of the object is such that the surface moves in and out of the focal plane, the quality of the characters printed is reduced. This can result in a change in the height, spacing and/or blurring of the characters making the code difficult or impossible to read. Obviously, this is not acceptable when the information being marked relates to important information such as plant location, date codes and lot numbers.

An example of a scanning type laser marking device is disclosed in U.S. Pat. No. 5,734,412 to Hasebe et al. As illustrated therein, a laser marking device including a laser, a scanner and a lens are employed for marking characters on a work piece "W" which is conveyed past the scanning laser beam. As illustrated in FIG. 1 of that patent the work piece is planar and all that is required is to maintain a constant focal distance to the work piece as the beam is scanned thereacross to create the desired markings.

Such devices would have quality problems with respect to work pieces or substrates which are not planar and/or which have a variable focal distance from the optics. In such a case, the markings on the substrate would be blurred, vary in height or spacing and could otherwise be unreadable thereby rendering the characters unsatisfactory for use.

The subject of focal distance and the correction thereof in a laser scanning system is discussed in some detail in U.S. Pat. No. 5,754,328 to Cobb et al. In this patent, laser scanning systems are classified into three types: objective scanners, pre-objective scanners and post-objective scanners. FIGS. 1A and 1B of the Cobb patent illustrate objective scanners utilizing a simple lens to focus a beam of light onto a work piece or part 12. Scanning is accomplished by either moving the lens or moving the part. Such a system does not provide any correction for focal distance.

FIG. 2 of the Cobb patent illustrates a pre-objective scanner employing a moving mirrored surface 22, typically a galvanometer or rotating mirrored polygon, to reflect a laser beam onto a lens 20. The lens then focuses the beam onto the work surface 12. As indicated in Cobb, a major advantage of pre-objective scanning is its high speed and its ability to have a flat field image. Disadvantages include that the lens is somewhat complex. Again, pre-objective scanners are typically used with flat work pieces.

Finally, in FIG. 3, Cobb discusses a post-objective scanner in which the scanning occurs after the beam passes through a lens 30. Note in FIG. 3A that this post-objective arrangement causes the laser beam 125 to be perfectly focused along an arc 31 but out of focus at various points on the planar surface of the work piece 32; as for example, at points 34 and 38. The Cobb patent basically describes an improvement of the post-objective scanner type shown in FIG. 3 in that it discloses a method and apparatus for astigmatically correcting the scanning so that the beam is focused along the planar surface 32 of the work piece. FIG. 7 of Cobb illustrates the improvement which, in large part, consist of tilting an objective lens 70 in a "mid-objective scanner system" by an angle alpha prior to the scanning mechanism 50. Before reaching the focal point the laser beam is again folded 90° by use of a concave mirror 77 having a defined radius of curvature. The radius of curvature 78 corrects the field of curvature in the image plane 75 of the work piece to be marked resulting in a flat field of depth for marking on the planar work piece.

Although Cobb discloses changes to the field of depth of a scanned laser beam, it provides a solution which differs significantly from that required to provide a variable field of focus for arcuate work pieces such as bottles, cans and labels which are applied to bottles which are basically cylindrical in cross section. Cobb also does not address the further issues that arise if the work pieces remain in motion along a conveyor belt or carrier wheel while it is being marked.

It is accordingly, an object of the present invention to provide a pre-objective scanner system for laser marking on moving arcuate substrates. It is a further object of the invention to provide such a system with a variable field of focus which matches the variable distance of the arcuate surface from the lens as the surface passes by the lens thereby to insure that the alpha-numeric characters marked on the surface are of uniform height, spacing and quality.

Other objects and advantages of the invention will be apparent from the remaining portion of the specification and drawings.

SUMMARY OF THE INVENTION

According to a preferred embodiment of the present invention, a pre-objective laser marker is disclosed in which a laser beam is scanned by an optical scanner, such as a mirror, a mirrored polygonal surface or an acousto-optical deflector across the surface of an optical element such as a spherical lens. From the lens, the beam is scanned onto a work surface to be marked, which surface is moving relative to the lens and which has a variable image distance from the lens due, for example, to the fact that it is mounted on an arcuate surface moving transversely to the lens while rotating as, for example, a label applying device. To match the variable image distance of the surface to the optics of the marking system, the lens is tilted as a function of the desired variation in the image distance. The result is a variable field of focus for the laser marker which, if it closely matches the variable image distance, results in the printing of high quality alpha-numeric characters on the work surface or substrate.

The invention also encompasses the ability to accurately synchronize a scanning device to the position and velocity of the product to be marked as it moves across the focusing lens. This synchronization permits the optimum placement of the laser beam on a tilted or aspheric focusing lens such that the laser focal point accurately matches the optimal surface position on the product for marking. This is accomplished by using an encoder that tracks the transverse motion of the arcuate surface as it moves along a carrier wheel, which is added to precalculated correction data that measures the rotation of the arcuate surface on an individual carrier mounted on the carrier wheel. In other words, an error signal, based on undetected motion, has been added to the scanner driver signal based on the motion detected by the encoder resulting in a scanner that tracks the product. Concurrently, as the scanner tracks the product, the laser beam is being scanned across the tilted optics in synchronization with the product. The result is a laser code optimally printed on moving and curved objects.

In more detail, a device for marking a relatively moving substrate by scanning a laser beam along an optical path generally defines a length that terminates at the substrate. The length of the optical path varies during marking. The marking device also includes a laser source for producing the laser beam and an objective lens with a surface disposed in the optical path to direct the laser beam onto the substrate. A scanner in the optical path scans the beam across the surface of the objective lens, so that the objective lens produces a variable image distance across the surface of the objective lens. A controller for synchronizing the scanning system to the motion of the substrate is also provided and includes an encoder for determining a first component of the movement of the substrate and a memory for storing data representing a second component of movement of the substrate. The controller combines the first and second components for driving the scanner. Due to the resulting combined signal, the variable image distance closely conforms to the variation in the length of the optical path, and the laser beam is maintained at a desired marking distance as it is scanned over the substrate.

DETAILED DESCRIPTION OF ILLUSTRATED EMBODIMENT

Figure 1:
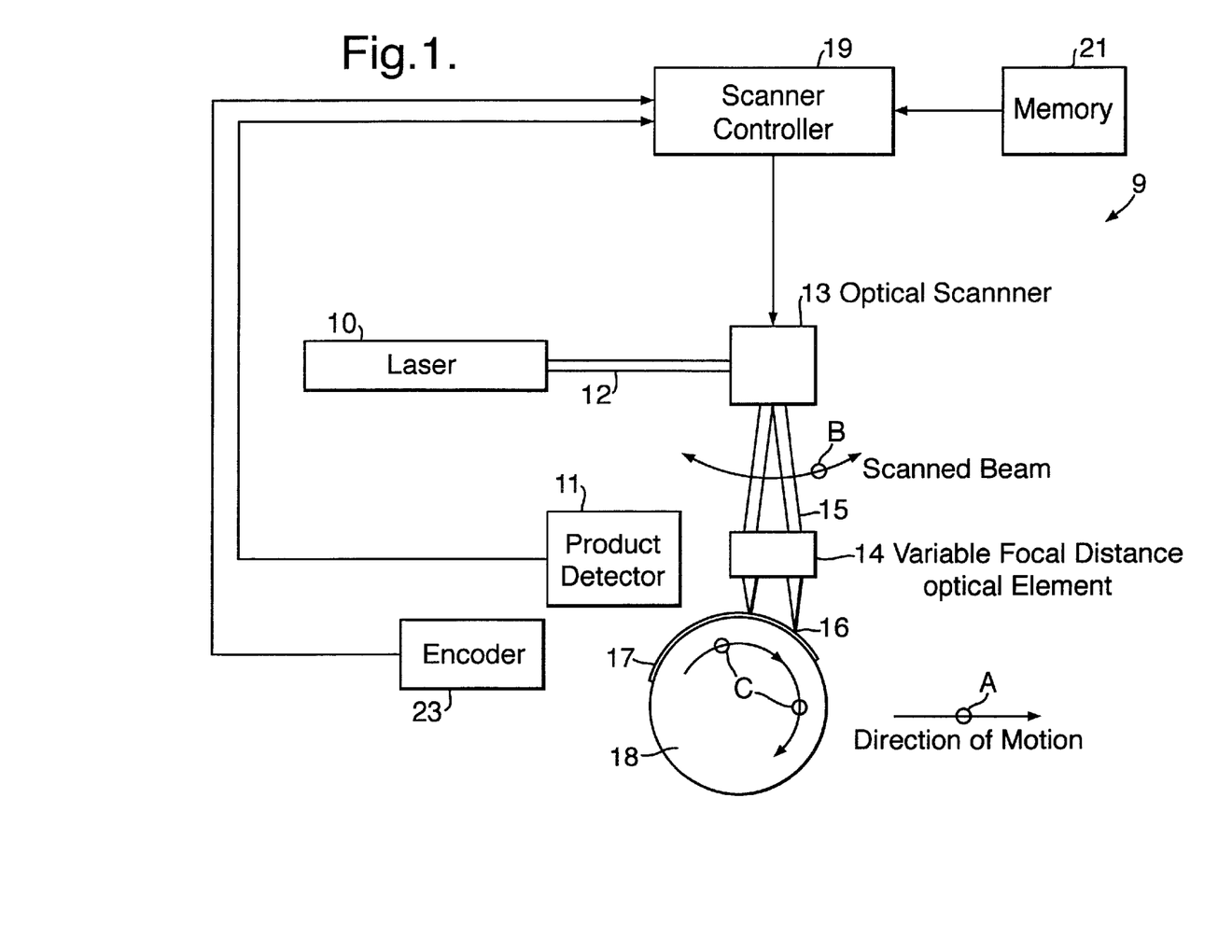
FIG. 1 is a schematic diagram of a laser marker system suitable for use with the present invention.

Referring to FIG. 1, a laser or marking device of the present invention, generally designated 9, has a laser source 10 that produces a laser beam 12. The beam 12 is directed to an optical scanner 13, which is a moving mirrored surface such as a galvanometer, a rotating mirrored polygon or an acousto-optical deflector. The optical scanner 13 scans the beam at 15 across the surface of a lens 14 as indicated by arrows B. The lens 14, as will be described, has a variable image distance thereby to cause the laser beam to accommodate the rotational path (directions A and C) of a substrate, product or label 17 with an arcuate surface indicated at 16 which is to be marked. A typical application for the present invention would be the marking of labels 17 which are applied to bottles while the labels are being moved from a label magazine to the bottles by a rotating element, such as a shoe or conveyor 18 or 32.

The optical scanner 13 is controlled by a microprocessor based scanner controller 19 that is wired to a product detector 11 strategically positioned along a transverse path (arrow A). The product detector 11 indicates the presence of the product or label 17 to the scanning controller 19, which initiates the marking process and starts a scanning sequence. An encoder 23 is also provided for synchronizing the optical scanner 13 with the motion of the product or label 17 as it moves in front of and past the lens 14 along the generally circular or arcuate, transverse path in direction A. In the preferred embodiment, the encoder 23 is attached to a rotary shaft 25 (shown in FIG. 2A) at the rotational center 37 of the transverse path A and is preferably a quadrature type shaft encoder that can detect the direction of motion as well as the velocity of the substrate 17 as it is carried by the conveyor 18. The encoder provides a first component of the movement of the substrate 17 relative to the optical scanner 13 which only represents a portion of the total motion of the substrate. In the preferred embodiment, the first component is a rotational component.

Figure 8:
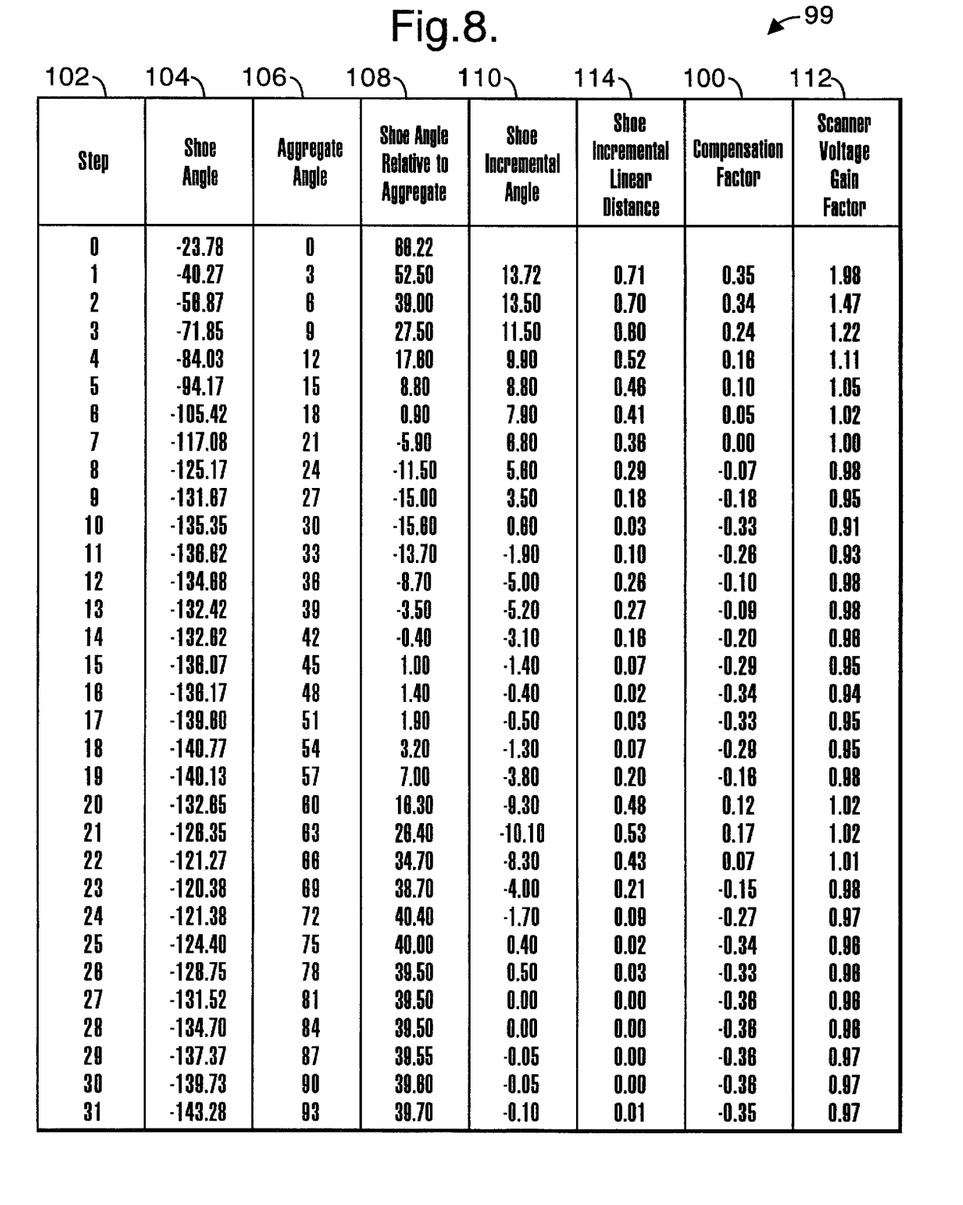
FIG. 8 is a table of measurements used to adjust an optical scanner for marking a moving arcuate surface in the present invention.

The marking device 9 also preferably includes a memory 21 for storing data representing a second component of the movement of the substrate 17 relative to the optical scanner 13. The memory 21 is readable by the controller 19. A table 99 (as shown in FIG. 8) is an example of the data for the second component that is used for correcting the gain factors for the laser source 10 and optical scanner 13. With the data previously stored as in table 99, the motion of the product or label 17 is anticipated by the optical scanner 13 as explained below.

Figure 2A:
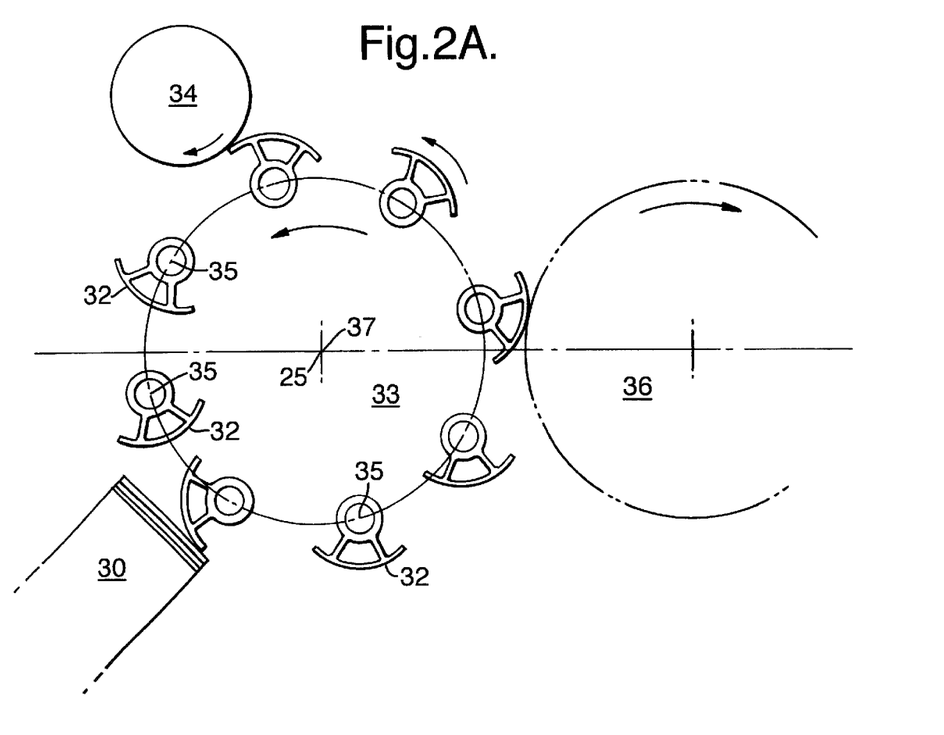
FIGS. 2A and 2B are plane views of a conveyor system in which bottles have labels placed thereon and in which the present invention marks indicia prior to the labels being placed on bottles.
Figure 2B:
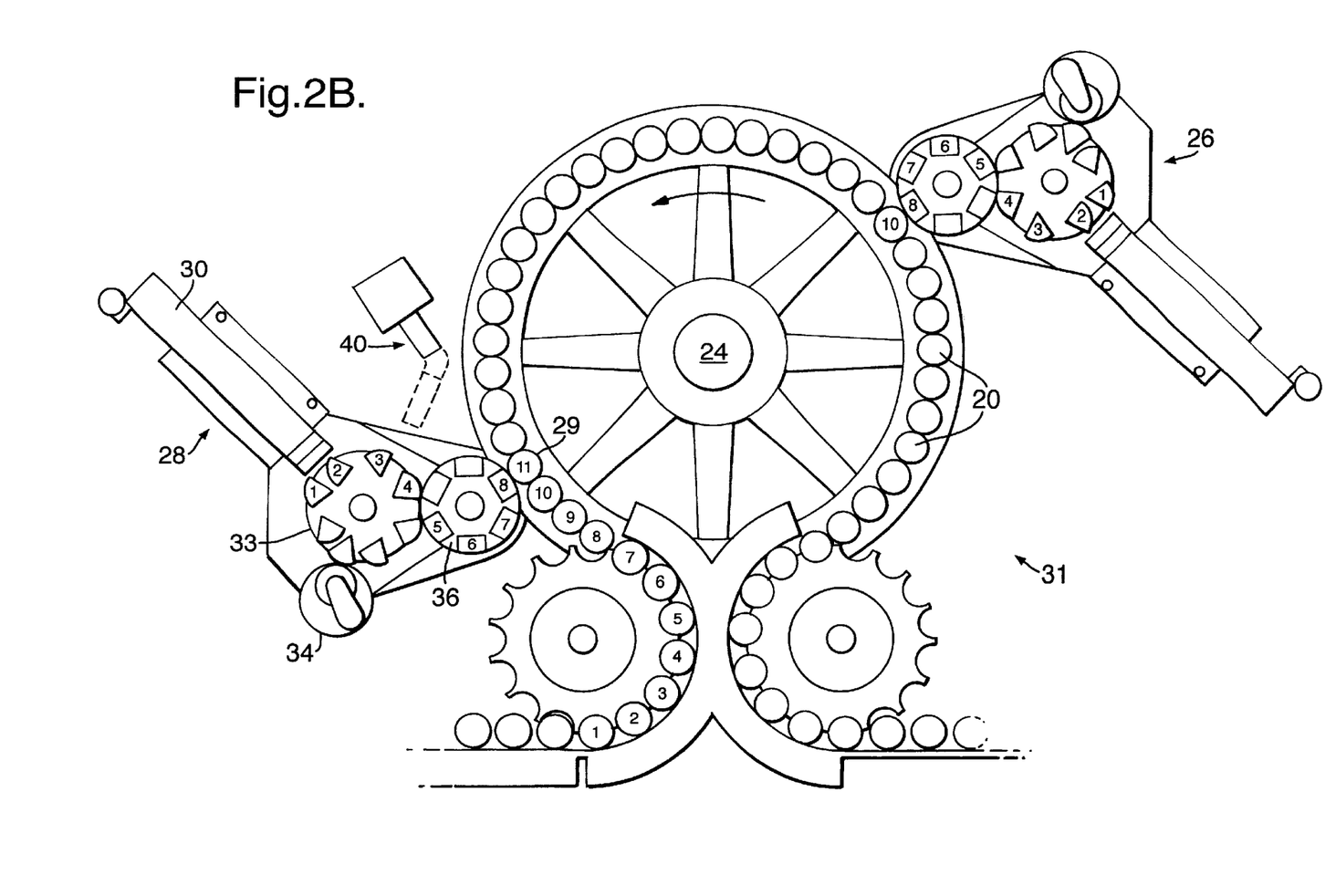

Referring now to FIGS. 2A and 2B, there is illustrated a typical application for which the present invention is suitably intended. FIG. 2A illustrates a commercially available label applying machine 26 or 28 while FIG. 2B illustrates the use of the label applying machine 26 and 28 in connection with a bottle conveyor system 31. Referring first to FIG. 2B, bottles 20 move along the conveyor system 31 which rotates counterclockwise. In FIG. 2B, the two label machines 26, 28 are disposed at various points along the outside circumference of the main bottle conveyor 24. The labeling machines 26 or 28, as shown more clearly in FIG. 2A, includes a label magazine 30 which contains a quantity of labels 17 which are to be applied to the bottles 20 as they move on the conveyor 24 past the label stations 26 and 28.

As shown in FIG. 2A, a plurality of arcuate carriers 32 rotate counterclockwise on a carrier wheel 33, moving past a glue roller 34 to the label magazine 30, where each carrier picks up a label 17 contained in the magazine and moves it from the magazine to a gripper cylinder 36 which, ultimately, transfers the label to a bottle 29. The carriers 32, often referred to as glue palettes, carry the labels past a laser marking device 9 of the type disclosed in FIG. 1. The laser marker 9 may be positioned as illustrated in FIG. 2B at 40 relative to the labeling machine 28. Thus, as the labels travel on the glue palettes 32 toward the gripper cylinder 36 they pass a laser beam (12 and 15 in FIG. 1) which marks the desired alpha-numeric characters onto the labels 17 prior to their being transferred to the gripper cylinder 36.

As will be apparent from a review of FIGS. 1 and 2A, while the labels 17 are secured to the glue palettes 32, the distance between the lens 14 of the marking system and the surface of the label 17 varies because the labels are secured on an arcuate surface 16 moving along on a path in direction A that is generally transverse to the path of the laser 15. Also in the preferred embodiment, the transverse path A is arcuate due to the carrier wheel, but may be straight along a conveyor belt. This arcuate motion introduces another factor that produces a variable image distance requirement that must be compensated for in order to insure that the alpha-numeric characters are of uniformly high quality. Finally, in addition to motion along path A, the carrier is simultaneously rotating (in direction C) about its own axis 35, which adds yet another factor to the variable distance.

Figure 3A:
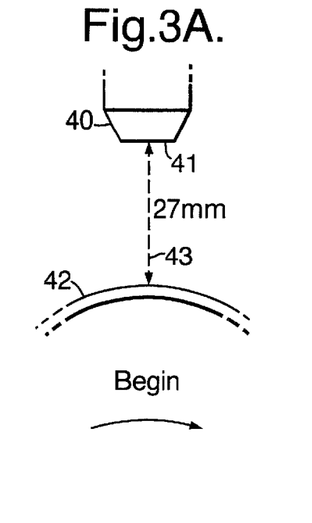
FIGS. 3A and 3B illustrate the nature of the problem solved by the present invention, due to the variation in the image distance between the marking device and the curved surface of the labels to be marked.
Figure 3B:
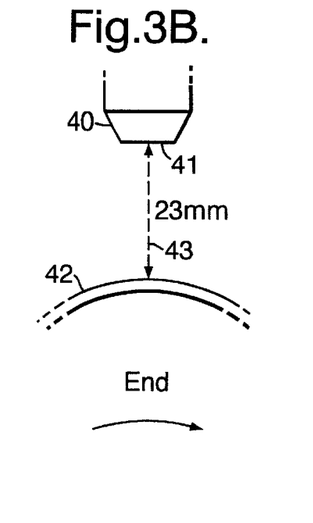

Referring to FIGS. 3A and 3B, the problem can be perceived more easily. The laser beam output 43 is produced from the lens 14 (shown in FIG. 1) through the end 41 of the marking device indicated at 40. The labels to be marked are indicated at 42 and, as illustrated in these figures, because of the movement of the glue palettes 32, which have arcuate surfaces 16, and which are rotating or turning about their own centers 35 in FIG. 2A, as well as rotating about the center 37 of the carrier wheel 33 along the circumference of the wheel 33, the image distance varies as the label 17 passes under the laser beam 43. For example, at the beginning of a typical marking run, the image distance between the laser marking device 40 and the label 42 might be on the order of 27 millimeters. At the end of the marking run of a typical string of alpha-numeric characters which can vary, for example, from four to fifteen characters, the image distance has been reduced to only 23 millimeters. Such variations are typical in applications of this type and can easily result in reduced quality rendering some of the characters unreadable. The labeling machine 28 is a very common application in the packaging industry. These types of machines are used for a wide variety of products from beer to salad dressing to pharmaceuticals. The laser marking device may also be used in applications where the label 17 has already been applied to the product. It is very common in such applications for the product to be moving in a rotational path where the same marking problems arise. Specifically, the product is often curved and moving away from or towards the laser marking system 9. The marking device 9 may also be applied to products having a linear motion (along direction A in FIG. 1) across a marking point if the product has a curved surface. In such a case the present invention would compensate only for the product shape and not its motion. The ability of the invention to compensate for irregular product shape and irregular product or label motion allows the production line to be designed for optimum product throughput.

One way in which the present invention solves such problems is by matching the variation of the distance to the substrate or label 17 to be marked with a corresponding rotation of the lens 14 so as to provide a varying image distance which closely matches the distance between the lens and the surface to be marked.

Figure 4:
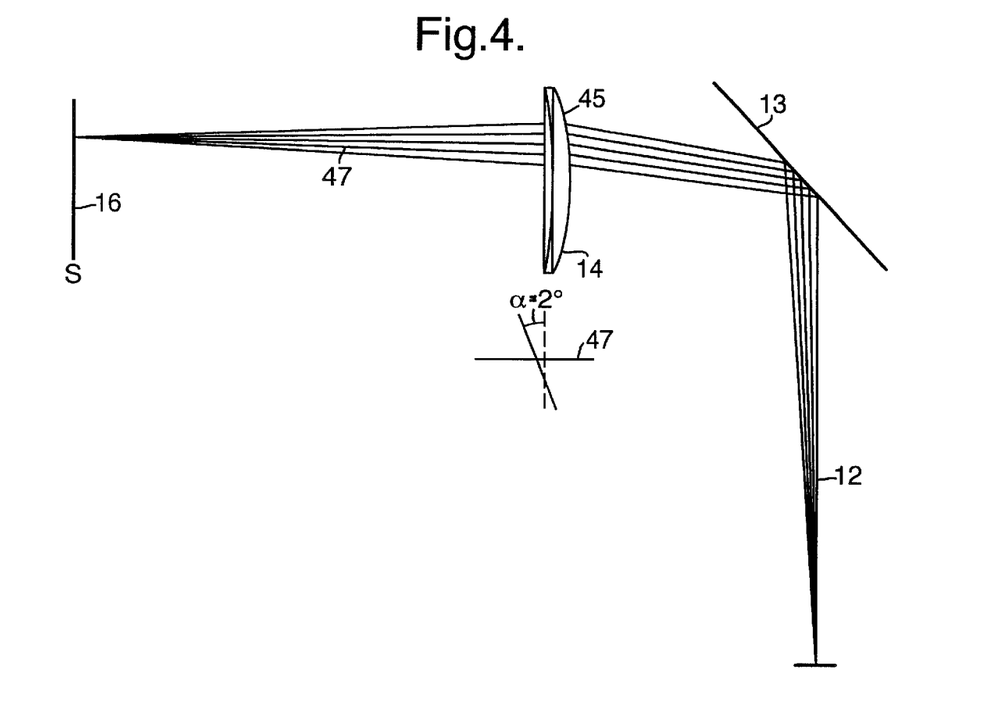
FIGS. 4 and 5 are optical diagrams illustrating the laser being scanned across a spherical lens tilted in accordance with the teaching of the present invention.
Figure 5:
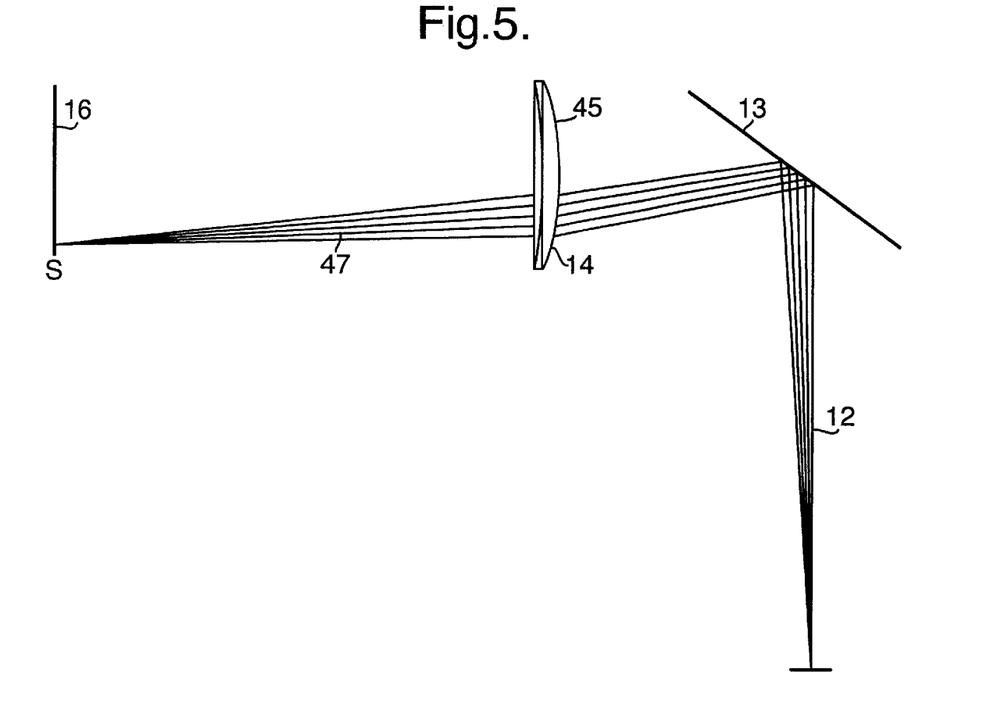

The manner in which this is accomplished can be seen with reference to FIGS. 4 and 5. Referring to these figures, there is illustrated an optical diagram for the system of FIG. 1. The laser beam 12 is directed at the optical scanner 13 which scans the beam across the surface 45 of the lens 14.

As can be seen by comparing FIGS. 4 and 5, the scanner 13 moves the beam from the top most portion of the lens 14 to the bottom most portion thereby to cause the beam to be focused and scanned across the surfaces 16 to be marked as that surface moves past the beam. In the example of FIGS. 4 and 5, the scanner causes the beam to move from a plus 10° to a point a minus 10° relative to the center of the lens 14. The optical scanner 13, as indicated previously, is typically a mirror with angular movement generated by a galvanometer, piezo-transducer, acousto-optic deflector, electro-optic deflector or other such means. The lens 14 has an image distance which varies as the laser beam 12 is scanned across its surface 45. One implementation of the lens 14 is a spherical lens mounted at an angle α with reference to the optical axis or path 47 such that the first optical element (the scanner 13) scans the beam 12 across the lens 14 in the direction of tilt. In the case of the example shown in FIGS. 4 and 5, a spherical lens 14 is tilted at approximately 2° with reference to the optical axis 47 of the scanner 13. As a result, at the upper extreme of the scan, +10°, the image distance from the lens 14 to the surface 16 to be marked is 96.9 millimeters. As shown in FIG. 5, when the scanned beam is at −10°, due to the 2° tilt of the lens, the image distance is reduced to 91.3 millimeters. It will be readily apparent this capability of producing a variable image distance can be used to solve the problem illustrated in FIGS. 3A and 3B with respect to a substrate 17 which is mounted to an arcuate conveyor 18 or which itself is arcuate. Thus, the varying image distances required to mark an arcuate surface 16 can be accommodated by use of a pre-objective system of the type shown in FIG. 1 in which the lens element is tilted by an amount corresponding to the desired variation in the image distance for the surface to be marked.

The following table presents typical values for different tilt angles for a lens subject to scanning from +10° to −10°. The first column is the tilt angle of the lens. The second column is the focal distance from the lens in millimeters for the scanner at +10 degrees. The third column is the focal distance for the scanner at −10 degrees. The fourth column is the difference in focal distance between the two scanner positions.

| Tilt ° | +10 | −10 | focal difference |
|---|---|---|---|
| 0 | 94.28 | 94.28 | 0 |
| 1 | 92.83 | 95.64 | 2.81 |
| 2 | 91.31 | 96.91 | 5.60 |
| 3 | 89.69 | 98.07 | 8.38 |
| 4 | 88.00 | 99.15 | 11.15 |
| 5 | 86.25 | 100.12 | 13.87 |

An alternative way of creating a variable image distance is to provide lens 14 as a "prescription" lens. That is to say that the lens 14 would have a variable image distance due to differing radii of curvature on its surface 49. Such a lens 14, referred to as an aspheric lens, may have different radii of curvature as is typical, for example, in eyeglasses for correcting astigmatism. According to the present invention, in place of tilting a spherical lens, it is possible to use an aspheric curvature in the scanning direction to introduce astigmatism for the purpose of changing the image distance in a non-linear manner across the scanning path. Such an approach would allow for carefully tailored compensation for printing on curved surfaces which may be arcuate or which may have complex variations in their surface resulting in complex variations in the image distance.

Indeed, even the label system of FIG. 2A creates a fairly complex variation in image distance because of the compound movement of the glue palettes 32 which are both rotating along the circumference of the palette wheel 33 about center 37 and rotating about its own center 35 as it moves from station to station. Although the embodiment illustrated in FIGS. 4 and 5 provides adequate compensation for the variation of the image distance, it would be possible to provide an aspherical lens which would exactly match the image distance variation as the labels move past the printing point. This would provide virtually perfect correction for the marking process, without the need to tilt the lens 14.

Figure 6A:
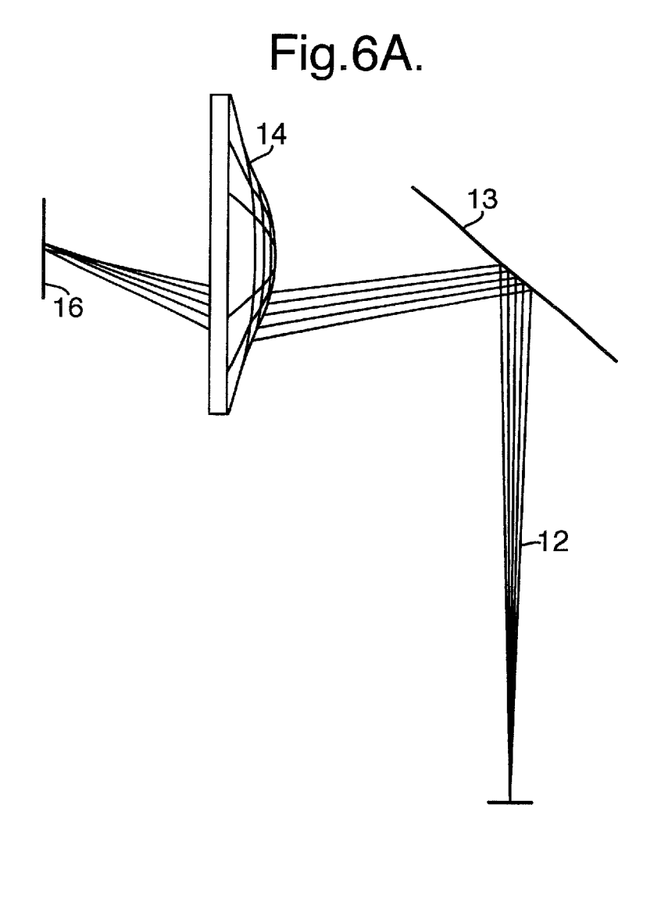
FIGS. 6A and 6B are illustrations of a lens having aspheric curvature in the scanning direction to introduce astigmatism for the purpose of varying the image distance across the scanned path according to a second embodiment of the invention.
Figure 6B:
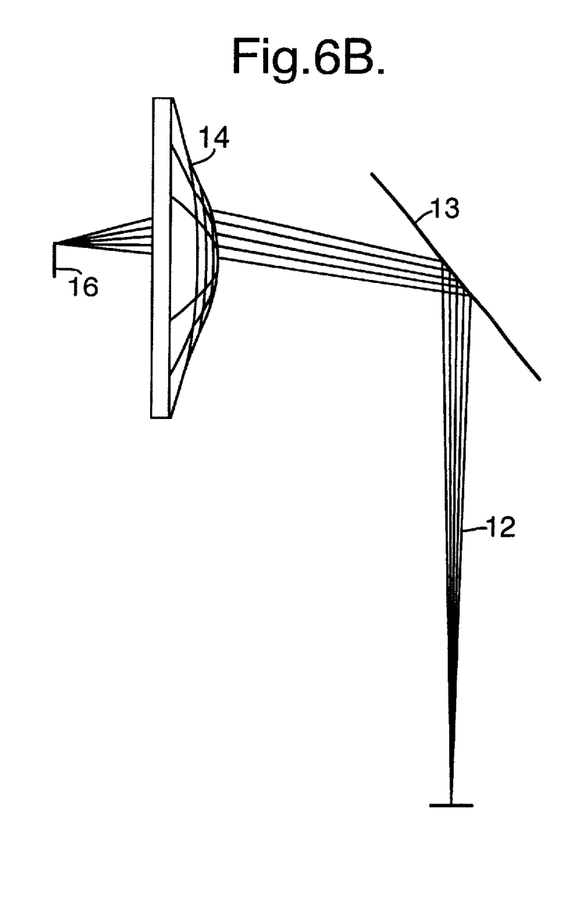

FIGS. 6A and 6B illustrate an aspherical lens 14 having such a variable radius of curvature which can be used for purposes of the present invention in place of the tilted spherical lens 14 shown in FIGS. 4 and 5. The aspheric curvature in the scanning direction would introduce astigmatism rather than eliminate it for the purpose of changing the image length across the scanning path.

FIG. 6A shows an aspherical lens scanned at +10°, with an image distance of 31.4 millimeters. FIG. 6B shows the same lens scanned at −10° with an image distance of only 18.5 millimeters. Such a lens can be crafted simply by specifying the required optical prescription.

An optical prescription is a set of parameters which completely describes the physical properties of a lens and therefor defines its optical performance. The parameters include the material properties such as the density, index of refraction, thermal characteristics etc.; the dimensional properties such as thickness, diameter, and position relative to the optical axis; and the surface profile of the two surfaces that make up the lens. The surface profile is defined by an equation which relates to sag or z-coordinate of every point on the surface to its respective x, y-coordinate. For example the non-rationally symmetric polynomial aspheric surface, called a polynomial surface, is given by $$z=\gamma_1 x^2+\gamma_2 x^4+\gamma_3 x^6+\gamma_4 x^8+\gamma_5 y^2+\gamma_6 y^4+\gamma_7 y^6+\gamma_8 y^8.$$

Other surface profiles such as biconic, toric, Fresnel, etc. may be similarly defined by an equation. The simple spherical surface may be defined by just the radius of curvature of the surface. Other parameters in the prescription may define the tolerances or special coatings. Once the prescription for the lens is given, the optical performance in terms of focal distance, aberrations and other optical characteristics is fully defined.

Referring again to FIG. 1, even if the lens 14 is appropriately tilted (as in FIGS. 4–5) or the lens 14 is a prescription lens (as in FIGS. 6A–6B), inaccuracies in focal length can still occur when the optical scanner 13 is not synchronized with the moving surface 16. As previously mentioned, a product detector 11 is used to indicate the presence of the surface 16 in the optical path 47, and an encoder 23 is used to track the transverse motion in direction A of the surface 16 as it travels along the circumference of the carrier wheel 33 so that the controller 19 knows the general position of the surface 16. This information is received by the controller 19 as a first component of the movement of the substrate 17.

The encoder 23, however, does not provide information regarding the change in distance to the optical scanner 13 and lens 14 due to (1) the curvature of the surface 16, and (2) the motion of the conveyors 18 or shoes 32 about their own centers 35 (in direction C). This additional motion further turns the surface 16 (as shown in FIG. 2A) which also changes the focal lengths from the lens 14 to the surface 16. For instance, in bottling lines, the bottles are rotated for labeling and marking in addition to the bottle's continuous circumferential motion along a conveyor belt or carrier wheel. These changes require further adjustment of the position of a mirror in the optical scanner 13. In these cases, the rotational motion of the product 17 not detected by the encoder is mechanically driven, repetitious, and therefore, predictable. In other words, the rotation of the conveyors or shoes 32 about their own centers or axes 35 can be measured. Thus, a table 99 holds second components that can be added to the first components for controlling the optical scanner 13 to compensate for the additional changes in focal length.

As shown in FIG. 8, the second components include correction voltages 112 used to change the position of a mirror in the optical scanner 13. Obtaining the correction voltages 112 includes the calculation and use of correction factors 100 shown on the table 99 (shown in FIG. 8) and stored in memory 21. Lens size, encoder resolution and message length to correct the encoded signal (i.e. voltage to the scanner driver to adjust the position of the lens 14 for the unencoded motion) is taken into account to calculate the correction factor 100.

Figure 9:
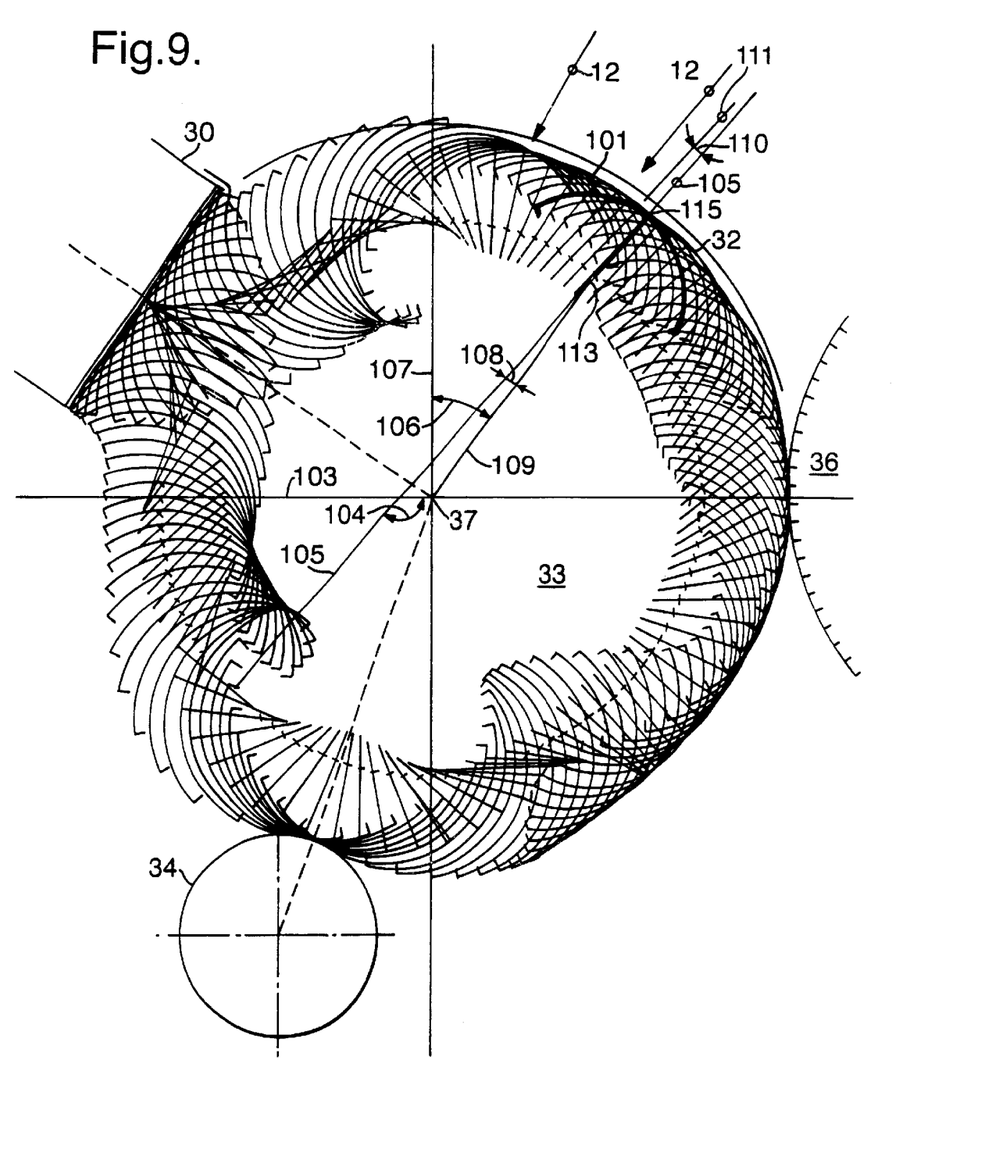
FIG. 9 is an illustration of the path of a carrier on a carrier wheel used in the present invention.

Referring now to FIGS. 8–9, table 99 is used to explain the calculation of the correction factors 100 for the unencoded data stored in memory 21 regarding a shoe or carrier 32 mounted on a rotating carrier table 33 and moving in the path shown in FIG. 9. The shoe or carrier 32 is highlighted in a position 101 for explanation of the relevant angles. A plurality of data points or carrier steps 102 are defined for each 3° rotation of the carrier wheel 33 indicated by the aggregate angles 106. The aggregate angle 106 is measured between a first line 107 extending from the center 37 of the carrier wheel 33 to a 0° position of the carrier wheel and a second line 109 connecting the center 37 of the carrier wheel 33 and the center 115 of the arcuate surface or label 16 on the shoe 32.

For each data point or carrier step 102, the carrier or shoe angle 104 is also measured. This is the angle between a line 103 connecting the center 37 of the carrier wheel 33 and a 90° position of the carrier wheel and a second line 105 extending a normal line 113 on the center 115 of the arcuate surface or label 16 on the shoe 32. The angular data is then used to calculate a shoe angle 108 relative to the mechanical position of the aggregate system or carrier wheel 33 for that carrier position and for each carrier position at least within the optical path. Angle 108 is graphically represented between lines 105 and 109.

An incremental carrier rotation 1 10 can then be calculated from step-to-step between line 105 representing the current position 101 and line 111 representing the next adjacent shoe position. Since the aggregate or carrier wheel 33 size is known, the incremental rotation 110 can be translated into incremental distance 114.

The compensation or correction factor 100 is then determined depending on the parameters for the individual application. Parameters impacting the correction factor are lens focal length, code length and product separation. The correction factors 100 are then converted into scanner gain voltage factors 114 that controls the amount of motion of the scanner relative to the motion of the product detected or determined by the encoder. A gain factor greater than one speeds the scanner up relative to the determined motion and a gain factor less than one slows the scanner relative to the determined motion. In this way, the scanner motion compensates for any known motion of the product 17 as it passes in front of the compensating optics that is not sensed by the encoder. The product detector 11 is used to start the compensation sequence and therefore provides the synchronization of the motion determined by the encoder and the preprogrammed motion of the scanner.

Figure 7:
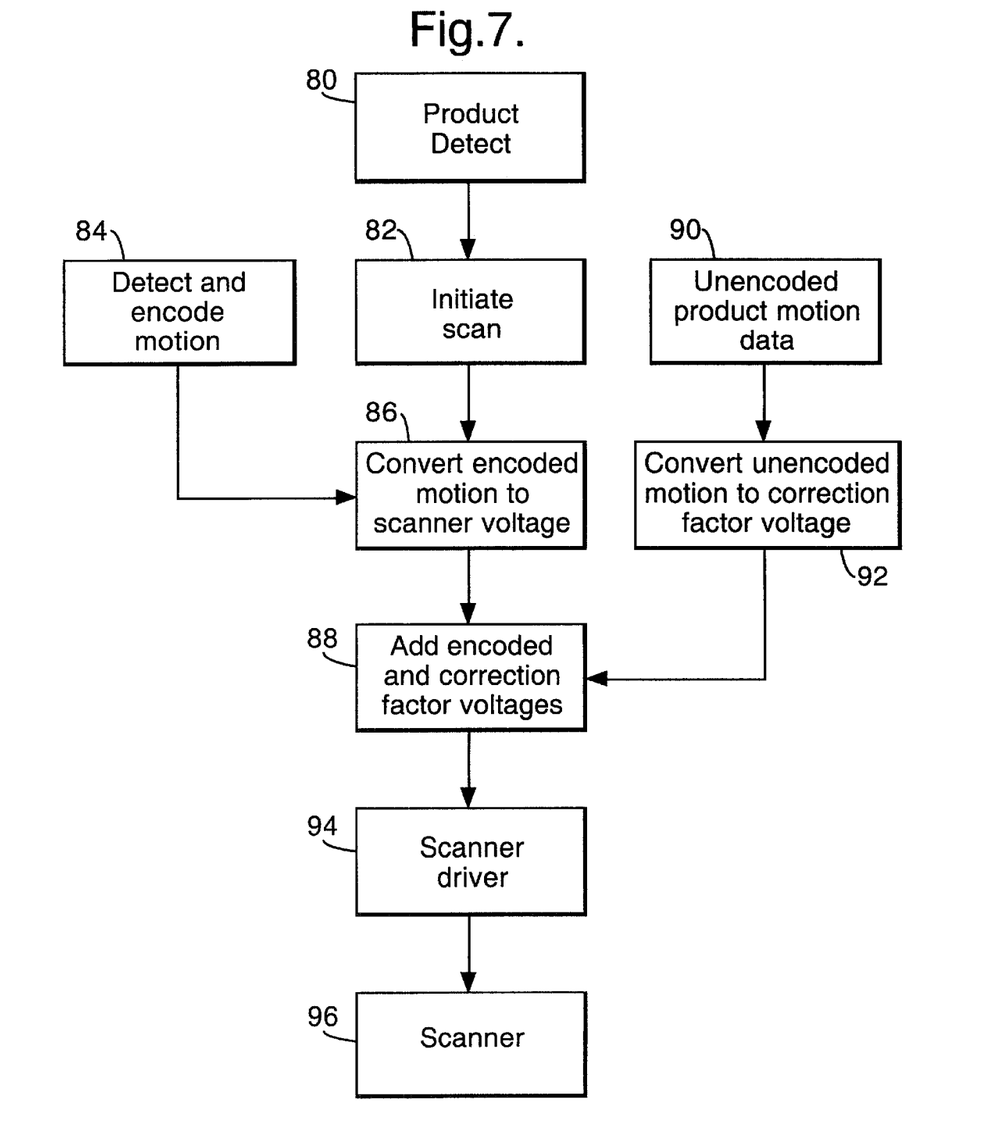
FIG. 7 is a flow chart for the general scanning process according to one of the embodiments in the present invention.

Referring now to FIG. 7, an overview of the operation of the scanning device 9 begins with the detection of the product by product detector 11 in step 80. In step 82, the detector sends a signal to the controller 19 to initiate the scanning process. The encoder 23 then provides the first component of the motion of the substrate by determining the motion and velocity of the carrier 18 as it passes in front of the lens 14 in a step 84 and provides the first component to the controller 19. The first component is converted to scanner voltages by the controller 19 in step 86. For step 88, the voltages of the first and second components are combined to form a final voltage for the scanner 13. In other words, the scanner voltages (first component) are then adjusted by the correction factor voltages (second component) 114 (shown on FIG. 8). The second components, including data that represents the correction voltages 114, were calculated previously and are stored in memory 21 for the controller's use in steps 90–92. Once the voltages are combined by the controller 19, in steps 94 and 96 the voltages are sent to the optical scanner 13 to drive the scanner and move its mirror accordingly. With this process, the laser beam 12 can accurately track the motion of the substrate 17 while appropriately adjusting its focus to compensate for the differences in focal length.

It will be appreciated that even though the preferred embodiment provides a first component to compensate for rotational motion around a carrier wheel 33 and the second component compensates for rotation of the carriers 32 about their own axes, the invention is equally applicable whenever an arcuate surface for marking is also in motion. Thus, the present invention can be used when the first component represents straight motion along a conveyor belt that moves an arcuate surface for marking. Similarly, the second component may represent the positional changes of the arcuate surface 16 along a path (whether arcuate or straight) without any additional rotation. This can occur, for example, when the carrier wheel has carriers locked in certain positions instead of rotating about their own axes. Finally, it will be appreciated that the invention may also compensate for a straight flat surface, rather than curved or arcuate surface, that is moved in an arcuate path in front of the laser marker.

While the invention has been illustrated as described in detail in the drawings and foregoing description, the same is to be considered as illustrative and not restrictive in character, it being understood that only the preferred embodiment has been shown as described and that all changes and modifications that come within the spirit of the invention are desired to be protected.

What is claimed is:

1. A device for marking a relatively moving substrate by scanning a laser beam along an optical path generally defining a length that terminates at the substrate, the length of the optical path varying during marking, the marking device comprising:

a laser source for producing the laser beam;

an objective lens having a surface disposed in the optical path to direct the laser beam onto the substrate;

a scanner in the optical path for scanning the laser beam across said surface of said objective lens, so that said objective lens produces a variable image distance across said surface of said objective lens; and a controller for synchronizing the scanner to the motion of the substrate, said controller including an encoder for determining a first component of movement of the substrate and a memory having stored therein data representing a second component of movement of the substrate, said controller combining said first and second components for driving said scanner, said second component corresponding to variation in said length of said optical path due to said substrate changing position closer to, or farther away from, said objective lens along said optical path, wherein said variable image distance closely conforms to the variation in the length of said optical path, whereby the laser beam is maintained at a desired marking distance as it is scanned over the substrate.

2. The device of claim 1, further including a product detector for informing said controller when said substrate enters a target area defined by a range of motion of said optical path.

3. The device of claim 1, wherein said first component is a first rotational component and represents motion along an arcuate path generally transverse to said optical path, and wherein said second component is a second rotational component and represents additional rotational motion along a path that varies in distance from said arcuate path, said encoder only detecting said first component, and said data including correction factors for compensating for said second component.

4. The device of claim 3, wherein said substrate is further supported by a carrier of a plurality of carriers all rotatably mounted along a circumference of a carrier wheel, wherein said arcuate path runs generally concentric to said circumference, wherein said first component represents rotation of said carrier wheel about a center of said carrier wheel, and wherein said second component represents rotation of each said carrier about its own center of rotation.

5. The device of claim 1, wherein said scanner is driven by voltage changeable by voltage gain factors, said first and second components being translated into said voltage gain factors for changing said voltage.

6. The device of claim 1, wherein said first component includes factors for both position and velocity of the substrate.

7. The device of claim 1, wherein said objective lens is generally spherical and said variable image distance is produced by tilting the objective lens, with reference to the optical axis of said laser beam, by an amount corresponding to the variation in the length of said optical path.

8. The device of claim 1 wherein said objective lens is aspherical and the variable image distance is produced by utilizing an optical prescription for the lens which closely conforms to the variation in the length of said optical path.

9. The device of claim 1, wherein the varying length of the optical path is formed by said movement of said substrate.

10. The device of claim 1, wherein the varying length of the optical path is formed by a shape of said substrate.

11. A scan type laser marking device which marks a relatively moving substrate by directing a laser beam along an optical path generally defining a length that terminates at the substrate, the length of the optical path varying during marking of the substrate, the marking device comprising:

a laser source for producing a laser beam;

an objective lens in the optical path to direct the laser beam onto the substrate and defining an image distance;

means for adjusting the image distance of said lens according to an optical prescription; and a controller for synchronizing the adjusting means to the motion of the substrate, said controller including an encoder for determining a first component of movement of the substrate and a memory having stored therein data representing a second component of movement of the substrate, said second component corresponding to variation in said length of said optical path due to said substrate changing position closer to, or farther away from, said objective lens along said optical path, said controller combining said first and second components for driving the adjusting means, whereby the laser beam is substantially maintained in focus on the substrate throughout the marking thereof.

12. A scan type laser marking device which marks a relatively moving substrate by directing a laser beam along an optical path generally defining a length that terminates at the substrate, the length of the optical path varying during marking of the substrate, the marking device comprising:

a laser source at a beginning of the optical path for emitting the laser beam;

an optical scanner in the optical path for deflecting the laser beam;

an objective lens in the optical path for receiving the deflected laser beam, said objective lens having an optical prescription which conforms to the variation in the length of said optical path; and a controller for synchronizing the optical scanning system to the motion of the substrate, said controller including an encoder for determining a first component of movement of the substrate and a memory having stored therein data representing a second component of movement of the substrate, said second component corresponding to variation in said length of said optical path due to said substrate changing position closer to, or farther away from, said objective lens along said optical path, said controller combining said first and second components for the optical scanner, whereby the laser beam is focused onto the substrate throughout the marking thereof.

13. A method of marking a relatively moving substrate, comprising the steps of:

producing a laser beam;

scanning the laser beam along an optical path generally defining a length that terminates at the substrate, the length of the optical path varying during marking;

directing the laser beam onto the substrate including scanning the laser beam across a surface of an objective lens disposed in the optical path, producing a variable image distance across the surface of the objective lens which closely conforms to the variation in the length of said optical path, and maintaining the laser beam at a desired marking distance as the laser beam is scanned over the substrate; and synchronizing the step of directing the laser beam with the motion of the substrate, including the steps of determining a first component of said motion of the substrate with use of an encoder, storing data representing a second component of said motion of the substrate, said second component corresponding to variation in said length of said optical path due to said substrate changing position closer to, or farther away from, said objective lens along said optical path, and combining said first and second components for directing the laser beam.

14. A device for marking a relatively moving substrate by scanning a laser beam along an optical path generally defining a length that terminates at the substrate, the length of the optical path varying during marking, the marking device comprising:

a laser source for producing the laser beam;

an objective lens having a surface disposed in the optical path to direct the laser beam onto the substrate;

a scanner in the optical path for scanning the laser beam across said surface of said objective lens, so that said objective lens produces a variable image distance across said surface of said objective lens; and a controller for synchronizing the scanner to the motion of the substrate, said controller including an encoder for determining a first component of movement of the substrate and a memory having stored therein data representing a second component of movement of the substrate, said controller combining said first and second components for driving said scanner, said second component corresponding to variation in said length of said optical path due to said substrate changing position closer to, or farther away from, said objective lens along said optical path, and wherein said first component is a first rotational component and represents motion along an arcuate path generally transverse to said optical path, and wherein said second component is a second rotational component and represents additional rotational motion along a path that varies in distance from said arcuate path, said encoder only detecting said first component, and said data including correction factors for compensating for said second component, wherein said variable image distance closely conforms to the variation in the length of said optical path, whereby the laser beam is maintained at a desired marking distance as it is scanned over the subtrate.

15. The device of claim 14, wherein said substrate is further supported by a carrier of plurality of carriers all rotatably mounted along a circumference of a carrier wheel, wherein said arcuate path runs generally concentric to said circumference, wherein said first component represents rotation of said carrier wheel about a center of said carrier wheel, and wherein said second component represents rotation of each said carrier about its own center of rotation.

* * * * *

UNITED STATES PATENT AND TRADEMARK OFFICE
CERTIFICATE OF CORRECTION

PATENT NO.     : 6,469,729 B1  
DATED          : October 22, 2002  
INVENTOR(S)    : Daniel J. Ryan It is certified that error appears in the above-identified patent and that said Letters Patent is hereby corrected as shown below:

Title page,  
Item [60], Related U.S. Application Data,  
Delete "[63] Continuation-in-part of application No. 09/418,713, filed on Oct. 15, 1999."  
Delete "[60] Provisional application No. 60/108,797, filed Nov. 14, 1998."  
Insert -- [63] Continuation-in-part of application No. 09/418,743, filed on Oct. 15, 1999. --

Column 1,  
Lines 7-8, delete "09/418,713 filed October 15, 1999 which claims the benefit of 60/108,797 filed Nov. 14, 1998." and insert -- 09/418,743 filed Oct. 15, 1999. --

Signed and Sealed this

Fifth Day of August, 2003

JAMES E. ROGAN  
*Director of the United States Patent and Trademark Office*